March 17, 1936.  E. G. HEDMAN  2,034,234
WEIGHING SCALE
Filed Jan. 11, 1933  2 Sheets-Sheet 1

Inventor,
Erik Gustaf Hedman,
by Walter P. Geyer
Attorney.

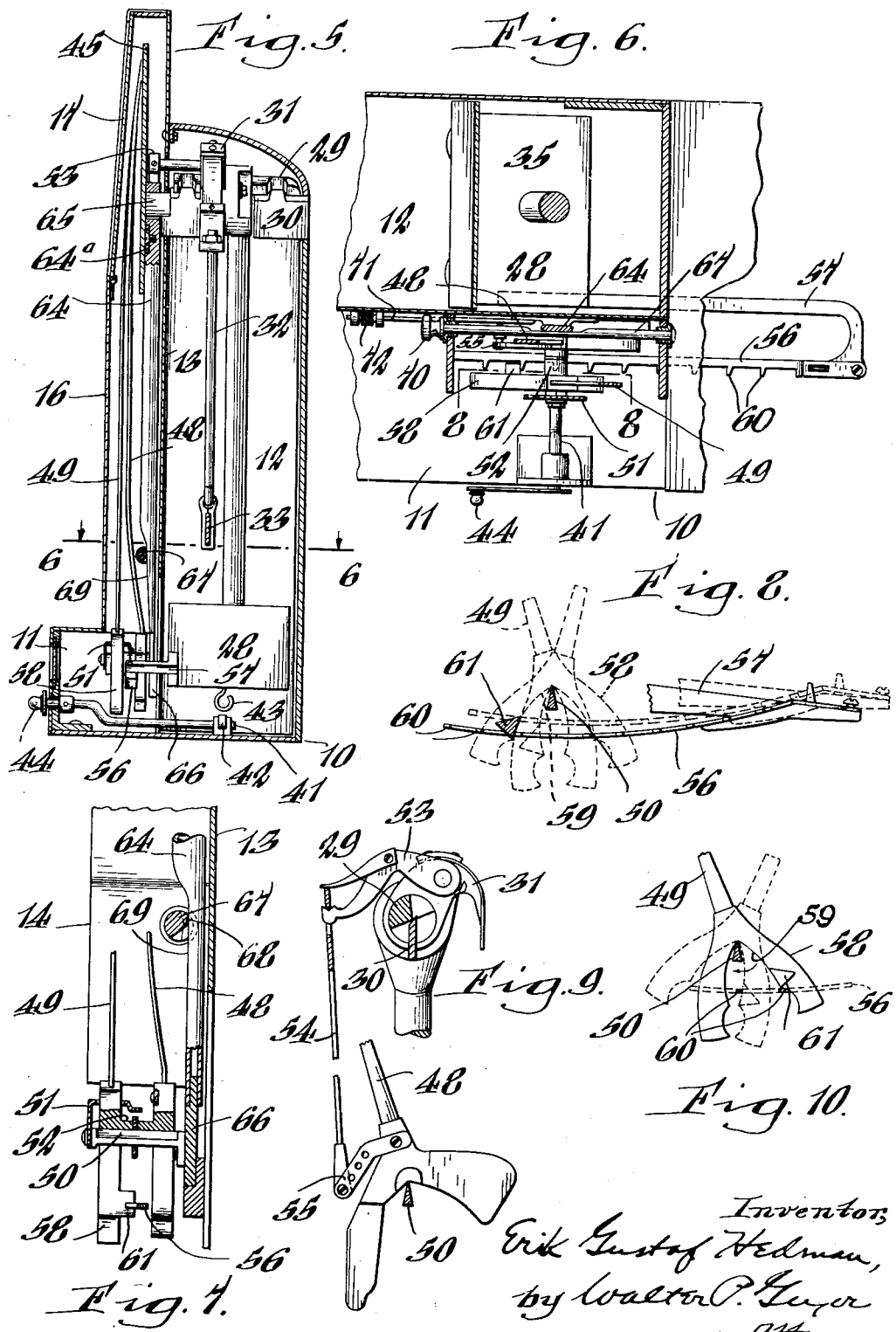

Patented Mar. 17, 1936

2,034,234

UNITED STATES PATENT OFFICE 2,034,234

WEIGHING SCALE

Erik Gustaf Hedman, Buffalo, N. Y.

Application January 11, 1933, Serial No. 651,089

11 Claims. (Cl. 265—62)

This invention relates to certain new and useful improvements in automatic weighing scales.

One of the objects of the invention is to provide a reliable and efficient weighing scale which is self-adjustable with respect to the weight-indicating pointers to insure accurate performance of the scale at all times.

Another object is the provision of an automatic weighing scale which is positive in operation, whose parts are designed to afford perfect balance, and which is provided with independent pound and ounce dial graduations, wherein the ounce graduations are of such magnitude as to be clearly visible so as to permit the convenient and accurate weighing of the lightest loads, and wherein separate pound and ounce pointers are employed for traversing the scale.

A still further object is to provide a scale of this character which is comparatively simple in construction, which is so designed as to afford the recording of both minimum and maximum weights, and which is free from springs and like instrumentalities which create friction and otherwise interfere with the accurate and sensitive performance of the scale.

Other features of the invention reside in the construction and arrangement of parts hereinafter described and particularly pointed out in the appended claims.

Figure 1:
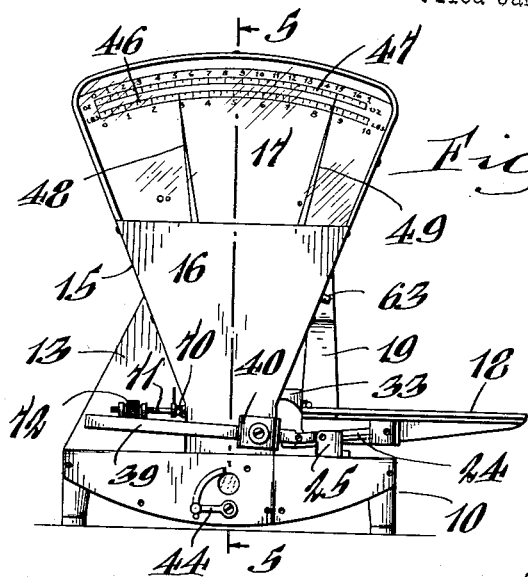
Figure 2:
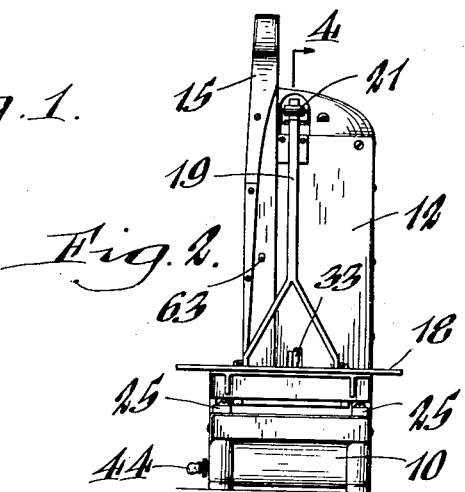
Figures 3, 4:
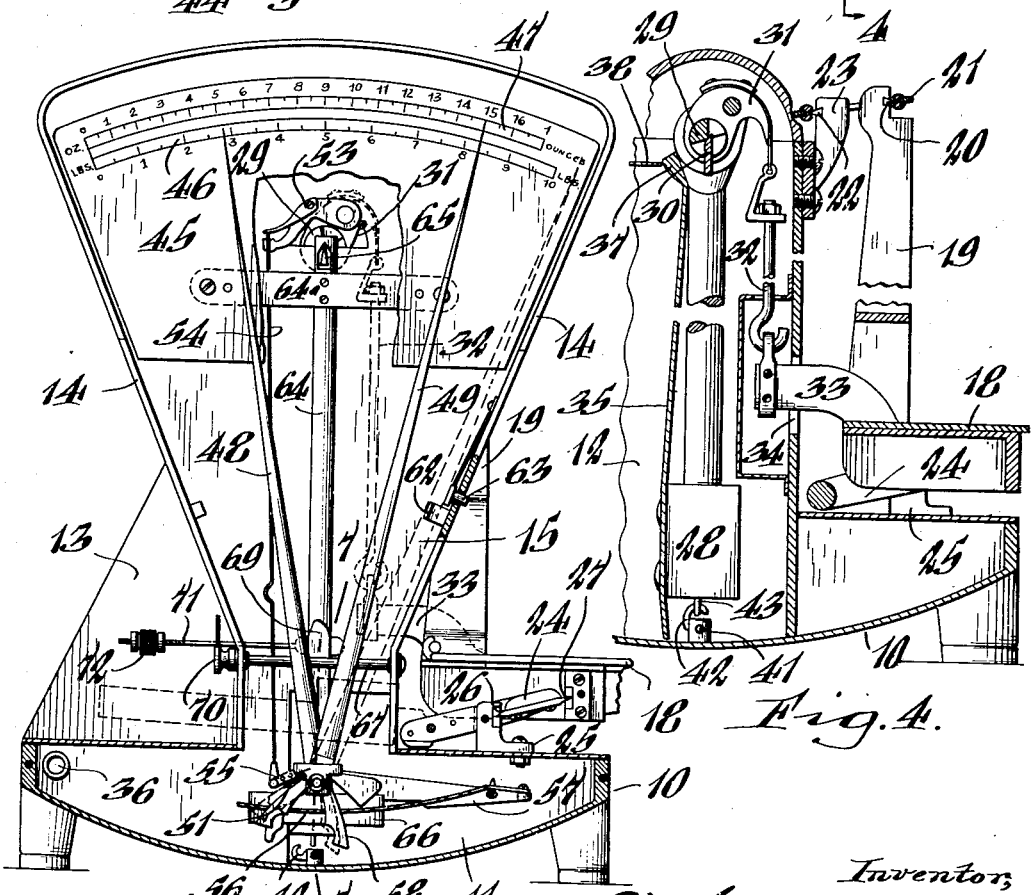

In the accompanying drawings: Figure 1 is a front elevation of a scale embodying my invention. Figure 2 is an end view thereof. Figure 3 is an enlarged front elevation of the scale, partly in section and with the front cover plate and transparent panel removed to show the operating mechanism of the dial and weight indicators or pointers. Figure 4 is an enlarged fragmentary vertical section taken substantially in the plane of line 4—4, Figure 2. Figure 5 is an enlarged transverse vertical section taken in the plane of line 5—5, Figure 1. Figure 6 is an enlarged fragmentary horizontal section taken on line 6—6, Figure 5. Figure 7 is an enlarged transverse vertical section taken in the plane of line 7—7, Figure 3. Figure 8 is a fragmentary vertical section taken on line 8—8, Figure 6. Figure 9 is a fragmentary front view partly in section showing the pound indicator or pointer and associated operating means. Figure 10 is a fragmentary rear view of the ounce pointer and trip bar associated therewith.

Similar characters of reference indicate corresponding parts throughout the several views.

By way of example, my improved automatic weighing scale has been illustrated in connection with a counter type of scale comprising a supporting frame or structure for its working parts preferably consisting of a casing 10 shaped to provide a lower, substantially horizontal chamber or compartment 11 at its front side and an upright compartment 12 at its rear side, in which the load-balancing mechanism is arranged. Said compartments may be separated by an upright partition or plate 13 which is provided on its front side with a rim 14 forming a substantially fan-shaped compartment 15 in which the dial and weight-indicating means are arranged and which opens at its lower end into the chamber 11, as seen in Figure 3. A cover 16 and transparent panel or window 17 is applied to the front side of the compartment 15, the scale-readings being visible through the window which is disposed at the upper end of said compartment, as seen in Figures 1 and 5.

Disposed over the chambered portion 11 of the casing and at one side of the upright compartment 12 thereof is a platform 18 for receiving the material to be weighed. The preferred means for suspending this platform for vertical movement consist of a suspension arm 19 rising from the inner end of the platform and connected at its upper end by a knife-edge pivot 20 with the outer end of a vertically-swinging link 21 whose inner end is fulcrumed on a knife-edge pivot 22 applied to a bracket 23 secured to the adjoining wall of the upright compartment 12. At its lower side the platform is connected to a vertically-swinging stabilizing or counter-balancing yoke or rock lever 24 of substantially U-shape in plan and fulcrumed intermediate its ends on front and rear bearing brackets 25 applied to the scale-base and carrying knife-edge pivots 26 and 27 engaging said brackets and platform, respectively, as shown in Figure 3. In the normal, unused position of the platform, the inner end of the stabilizing yoke abuts against the adjoining top side of the scale-base.

Associated with the platform 18 is a load-balancing member or pendulum 28 which is arranged within the upright compartment 12 and which is provided at its upper end with a bearing element or rock shaft 29 arranged transversely of the scale and engaging a knife-edge pivot or bearing 30 for permitting a free swinging movement of the pendulum in response to the movements of the platform. The pendulum rock shaft is operatively connected to the platform 18 through the medium of a crank arm 31 applied to said shaft and connected by a link 32 with an arm 33 projecting inwardly from the platform and passing through an upright slot 34 in the adjoining side wall of the compartment 12. Associated with the pendulum for the purpose of absorbing or cushioning any shocks, oscillations or undue vibrations escaping from the platform and associated parts incidental to the application and removal of the load to and from the platform, is a blade or vane 35 which is of such dimensions as to fit comparatively snugly within the compartment 12 and thereby provide a pneumatic or pump-like action for accomplishing the results stated. The bottom wall of the compartment 12, as seen in Figure 4, is arcuate in shape having its curvature radiated from the axis of the rock shaft 29. The cushioning chamber provided by this construction preferably communicates with the adjoining compartment 11 at the front side of the base through the medium of a port 36 formed in the partition 13, as seen in Figure 3. For the purpose of providing an air seal between the upper end of the vane 35 and the adjoining end of the compartment 12, I provide said vane with an arcuate portion 37 which engages the knife-like edge of a plate 38 provided as a closure for the upper end of the compartment 12.

For the purpose of adjusting the scale for tare weight, I provide the platform-engaging lever 24 with a substantially horizontally extending arm 39 which is positioned at the front side of the scale and on which is mounted a sliding weight 40.

By mounting the platform in the manner described, the same is effectually counter-balanced by the lever 24 together with the tare weight arm 39, thereby leaving the load-balancing pendulum free and merely responsive to the loads placed upon the platform.

During shipment of the scale, it is desirable to latch the load-balancing pendulum 28 against movement and prevent oscillation and vibration thereof as well as the parts operatively connected to it. To this end, I provide a rotatable latch bar 41 disposed transversely in the lower portion of the scale-casing and provided at its inner end with a hook 42 which is adapted to interlock with an eye 43 depending from the pendulum, as seen in Figures 3, 4 and 5. The outer end of this latch bar has a handle 44 for turning it into and out of latched position.

The indicating mechanism of my improved weighing apparatus is so designed as to not only permit a reading in pounds of the weight placed upon the scale but also a magnified reading of the ounces as well, and to this end the mechanism is constructed as follows:

Disposed within the fan-shaped compartment 15 of the scale and visible through the window 17 thereof is a weight-indicating panel or dial face 45 which, in the example shown in the drawings, is provided with a row of weight graduations 46 which indicate a plurality of pounds and a parallel row of weight graduations 47 which represent ounces, these rows being of substantially the same length and the ounce scale being magnified or graduated so that its overall length represents sixteen ounces or a fraction thereover, as will be seen by reference to Figures 1 and 3. Associated with the weight-indicating dial to traverse the respective rows of weight graduations 46 and 47 are companion swinging indicators or pointers 48 and 49, respectively, these pointers being disposed side by side transversely of the scale-casing 10 and each fulcrumed for independent swinging movement upon a common knife-edge pivot 50, which is disposed centrally beneath the graduation scale 45 and in vertical alinement with the pendulum-axis 29. The ounce-indicating pointer 49 is disposed forwardly of the pound-indicating pointer 48, as seen in Figures 5 and 7, and in order to prevent vertical displacement of the first mentioned pointer relative to its pivot 50, I provide a retaining yoke 51 which may be secured to the pivot 50 and which overhangs the hub portion 52 of the ounce pointer. These pointers are actuated in response to the movement of the load platform 18 preferably through the medium of the load balancing pendulum 28 so that when the pendulum is swung in one direction, or the other, that is to the left, viewing Figure 4, as the result of a load being placed upon the platform, the pointers are accordingly swung to the right about their pivots, the pound pointer 48 registering the weight of the load in pounds and the ounce pointer registering the number of ounces over the given pound weight.

The means for actuating the pound-indicating pointer 48 preferably consist of an arm 53 eccentrically mounted in fixed relation on the crank arm 31 and a thrust link 54 connecting the free end of said arm with a bracket or extension 55 applied to the lower end of the pound pointer at a point above the fulcrum or knife-edge pivot 50.

The ounce-indicating pointer 49 is so actuated that it travels sixteen ounces or a fraction thereover for each pound movement of the pound pointer 48 so that if, for example, the load placed upon the platform weighs between one and two pounds, the ounce-indicating pointer will accurately register in ounces the additional weight of such load over the pound reading. The means for thus actuating the ounce-pointer relative to the pound-pointer consists of a trip element or bar 56 mounted at one end on a bracket or carrier arm 57 applied to the pendulum 28, so as to be capable of a limited displacement relative thereto in a vertical plane, and disposed for an oscillating movement in an arcuate path below the knife-edge pivot 50, so that at predetermined times in the movement of the pendulum, this trip element will encounter the ounce-pointer and automatically shift the same to an indicating position in accordance with the weight of the load placed upon the platform. The trip element and the companion cooperating part on the pointer are so constructed and arranged that for each successive pound travel of the pound-pointer 48, the ounce-pointer 49 will travel sixteen ounces on its corresponding ounce-scale 47, the ounce-pointer being movable to the left or backwardly to its initial position as the pound-pointer successively travels from one pound indication to another, whereby the ounce-pointer will clearly and visibly register, in ounces, the additional weight above that registered by the pound-pointer, should the pound pointer go beyond a given pound graduation. Should the pound pointer register directly on an even pound graduation, then the ounce-pointer will register with "0" on the ounce scale. To accomplish these ends, the ounce pointer 49 is preferably provided at its lower end with an actuating head or yoke 58 having a substantially inverted V-shaped bearing notch 59 in its lower edge which rests upon the knife edge pivot 50. The trip element 56 is concentric with the axis of the pendulum fulcrum and is provided along its front longitudinal edge with a series of equally-spaced teeth or projections 60 which are adapted to encounter a lug or tappet 61 on the pointer-yoke 58 disposed below the fulcrum thereof and thereby cause the ounce pointer to swing about its fulcrum in response to a load being placed upon the scale. The teeth 60 are so spaced that each space corresponds approximately to the sixteen ounce travel of the ounce-pointer, and the tappet 61 is so shaped that after each operative movement of the ounce-pointer across the dial, said tappet, by reason of the swinging of its pointer, is released from engagement with its companion tooth and the ounce-pointer is then free to swing backwardly by gravity, due to its slight over-balancing, to its initial position, whereupon the next succeeding tooth 60 encounters said trip lug to again swing the pointer across its scale. This oscillating action of the ounce-pointer continues for each pound registered, so that if the weight of the load is, say over three pounds, the ounce-pointer would have swung back and forth three times and after the third time would automatically and accurately register the number of ounces over three pounds.

If desired, however, the ounce-indicating pointer 49 may be frictionally or otherwise held at the right hand side of the dial 45, as by a spring catch 62 applied to the adjoining portion of the rim 14, until such time as its use is required. After the load is placed on the scale and the pound-pointer 48 is indicating the weight in pounds, the ounce-pointer may be released say by a manually operated button 63, thereby permitting the ounce-pointer to automatically seek its ounce-indicating position for the imposed load. In the latched position of the ounce-pointer, its tappet 61 is clear of the toothed trip bar 56, so that the latter is free to move with the load-balancing pendulum 28.

The weight-indicating dial plate 45 is preferably adjustable to properly register or adjust the zero points of the scale with the respective pointers 48 and 49.

For this purpose, the weight-indicating panel 45 is attached to the upper end of a vertically-swinging pendant rod 64, as by a cross bar 64ª, said rod being fulcrumed at its upper end on a knife-edge pivot 65 which may be secured to the adjoining portion of the partition 13, as seen in Figures 3 and 5. At its lower end, this rod is provided with a weight 66 which constantly maintains the same in a pendant position and attached thereto is the knife-edge pivot 50 upon which the pound and ounce-pointers are fulcrumed. By this construction, the dial and pointers are self adjustable, the pointers and their pivot following the weighted rod 64 and remaining in a definite position relative to the dial, irrespective of the condition of the counter upon which the scale is supported. If desired, the dial may be held in a fixed position by means of a suitable clamping device, which, as shown in Figures 3 and 7 of the drawings, consists of a rock shaft 67 disposed at the lower end of the fan-shaped compartment 15 and provided with a cam-like face 68 adapted to be brought into and out of frictional engagement with a flat or like spot 69 formed on the lower portion of the rod 64. Said shaft has a suitable handle 70 for actuating it. For effecting a manual adjustment of the pointers and dial, should it not be desired to employ the automatic adjustment of these parts, I provide an actuating stem 71 connected at one end to the rod 64 and having its opposite end threaded and engaging an adjusting nut 72 held against axial movement relative to the stem.

I claim as my invention:—

1. A weighing scale, comprising a casing, a load-balancing element, a dial having a row of pound graduations thereon and a parallel row of ounce graduations, the overall length of the latter being approximately equal in length to the row of pound graduations and representing overall sixteen ounces, pointers fulcrumed to traverse said respective dial-rows, and means for individually actuating said pointers in response to the movement of the load-balancing element, whereby the ounce pointer travels the overall length of its scale for each pound travel of the pound pointer.

2. A weighing scale, comprising a supporting member, a swinging element fulcrumed at its upper end on said supporting member for movement in the plane thereof and tending constantly to seek a pendant, upright position, a dial mounted on the upper end of said pendant element to move therewith and having independent concentric rows of pound and ounce graduations thereon, a pound-indicating pointer and an ounce-indicating pointer fulcrumed at the lower end of the pendant element for independent swinging movement across the respective dial-graduations, and weight-responsive means for actuating said pointers.

3. A weighing scale, comprising a supporting member, a swinging element fulcrumed at its upper end on said supporting member for movement in the plane thereof and tending constantly to seek a pendant, upright position, a dial mounted on the upper end of said pendant element to move therewith and having independent concentric rows of pound and ounce graduations thereon, a pound-indicating pointer and an ounce-indicating pointer fulcrumed at the lower end of the pendant element for independent swinging movement across the respective dial-graduations, a load-balancing member, means operatively connecting said pound-indicating pointer with said load-balancing member, and separate means for operatively connecting said ounce-indicating pointer with said member.

4. A weighing scale, comprising a supporting member, a swinging element fulcrumed at its upper end on said supporting member for movement in the plane thereof and tending constantly to seek a pendant, upright position, a dial mounted on the upper end of said pendant element to move therewith and having independent concentric rows of pound and ounce graduations thereon, the ounce scale being approximately equal in length to the overall length of the pound scale and representing sixteen ounces, weight-indicating pointers for traversing said scales, respectively, and fulcrumed adjacent the lower end of said pendant element, and weight-responsive means for independently actuating said pointers, whereby the ounce pointer travels the overall length of its scale for each pound travel of the pound pointer.

5. A weighing scale, comprising a supporting member, a swinging element fulcrumed at its upper end on said supporting member for movement in the plane thereof and tending constantly to seek a pendant, upright position, a dial mounted on the upper end of said pendant element to move therewith and having independent concentric rows of pound and ounce graduations thereon, the ounce scale being approximately equal in length to the overall length of the pound scale and representing sixteen ounces, separate weight-indicating pointers fulcrumed at the lower end of said pendant element for independently traversing their respective scales, a load-balancing member, means operatively connecting the pound-indicating pointer with said load-balancing member, and means for operatively connecting said ounce-indicating pointer with said member, whereby the ounce-indicating pointer alternately traverses its ounce scale forwardly and backwardly for each pound traversed by the pound-indicating pointer.

6. In a weighing scale, a load-balancing element, a dial having a row of graduations thereon representing a plurality of pounds and a second row of graduations parallel to the first and coextensive therewith and representing sixteen ounces overall, pointers fulcrumed at their lower ends to traverse the respective rows of pound and ounce graduations, means operatively connecting the pound-indicating pointer with said load-balancing element, and trip means actuated by said element for releasable engagement with the ounce pointer to alternately propel the same across its ounce graduations for every corresponding pound-traversing movement of the pound pointer and to release the ounce pointer at the end of its sixteen ounce travel, said ounce pointer being counter-weighted to constantly swing it to its initial normal position.

7. In a weighing scale, a load-balancing element, a dial having a row of graduations thereon representing a plurality of pounds and a second row of graduations parallel to the first and coextensive therewith and representing sixteen ounces overall, pointers fulcrumed at their lower end to traverse the respective rows of pound and ounce graduations, means operatively connecting the pound-indicating pointer with said load-balancing element, a trip element connected to said load-balancing element and having a plurality of spaced teeth thereon, and a tappet applied to said ounce-pointer for releasable engagement with said teeth, said tappet being engageable with one or another of the trip element teeth during the complete forward travel of the ounce pointer over its row of graduations and being releasable therefrom at the end of such travel, said ounce pointer including means for constantly urging it to its initial position at the "0" end of its respective row of graduations.

8. In a weighing scale, a load-balancing element, a dial having a row of weight graduations thereon, a pointer fulcrumed to traverse said dial and constantly tending to seek the "0" position thereof, a tappet on said pointer, and a trip element applied to said load-balancing element for releasable engagement with said tappet to propel said pointer over its dial when a load is imposed upon the scale.

9. In a weighing scale, a casing having an air chamber, a load-balancing pendulum completely housed within said chamber and having a blade applied thereto extending substantially from end to end thereof and fitting said chamber to provide a pneumatic cushion for the pendulum.

10. In a weighing scale, a supporting structure including separate compartments, a load-balancing pendulum arranged in one of said compartments, a load-receiving platform operatively connected to said pendulum, a weight-indicating mechanism arranged in the other of said compartments and actuated by said pendulum, and a blade applied to said pendulum to move therewith in said first-named compartment, the latter and said blade jointly providing a pneumatic cushioning means for the pendulum and its aforesaid associated parts.

11. A weighing scale, comprising a casing, a dial having independent concentric rows of pound and ounce graduations thereon, the ounce scale representing sixteen ounces and being substantially of the same overall length as the pound scale, separate weight-indicating pointers fulcrumed for independently traversing their respective scales, a load-balancing member, means operatively connecting the pound-indicating pointer with said load-balancing member, and means for operatively connecting said ounce-indicating pointer with said member, whereby the ounce-indicating pointer alternately traverses its ounce scale forwardly and backwardly for each pound traversed by the pound-indicating pointer.

ERIK GUSTAF HEDMAN.